(12) United States Patent
Kazmi et al.

(10) Patent No.: US 11,395,163 B2
(45) Date of Patent: Jul. 19, 2022

(54) METHOD AND APPARATUS FOR CELL MEASUREMENT IN A COMMUNICATIONS SYSTEM

(71) Applicant: Telefonaktiebolaget LM Ericsson (publ), Stockholm (SE)

(72) Inventors: Muhammad Kazmi, Sundbyberg (SE); Mikael Prytz, Rönninge (SE); Imadur Rahman, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 94 days.

(21) Appl. No.: 16/631,788

(22) PCT Filed: Jul. 26, 2017

(86) PCT No.: PCT/EP2017/068864
§ 371 (c)(1),
(2) Date: Jan. 16, 2020

(87) PCT Pub. No.: WO2019/020178
PCT Pub. Date: Jan. 31, 2019

(65) Prior Publication Data
US 2020/0187031 A1    Jun. 11, 2020

(51) Int. Cl.
*H04B 7/185* (2006.01)
*H04W 4/42* (2018.01)
(Continued)

(52) U.S. Cl.
CPC ........ *H04W 24/08* (2013.01); *H04B 7/18506* (2013.01); *H04W 4/42* (2018.02);
(Continued)

(58) Field of Classification Search
CPC ... G05D 1/0011–1/0022; G05D 1/0276–0285; H04B 7/185–18508;
(Continued)

(56) References Cited

U.S. PATENT DOCUMENTS 8,639,265 B1    1/2014    Gauba et al.
9,357,552 B1    5/2016    Gauba et al.
(Continued)

FOREIGN PATENT DOCUMENTS

WO    2017108344 A1    6/2017

OTHER PUBLICATIONS

International Search Report and the Written Opinion of the International Searching Authority, issued in corresponding International Application No. PCT/EP2017/068864, dated Mar. 29, 2018, 12 pages.

*Primary Examiner* — Timothy J Weidner
(74) *Attorney, Agent, or Firm* — Rothwell, Figg, Ernst & Manbeck, P.C.

(57) ABSTRACT

Disclosed are methods for performing radio measurements in a wireless device and methods in a network node for managing radio measurements performed by a wireless. Also disclosed are a network node and a wireless device suitable for performing the disclosed methods. A wireless device obtains an indication of a first cell carrier frequency associated with a first altitude range and an indication of a second cell carrier frequency associated with a second altitude range, determines an altitude of the wireless device and performs a radio measurement on a signal received from a cell operating on the first cell carrier frequency only when the altitude of the wireless device is within the first altitude range and performing a radio measurement on a signal received from a cell operating on the second cell carrier frequency only when the altitude of the wireless device is within the second altitude range.

16 Claims, 9 Drawing Sheets

(51) Int. Cl.
  *H04W 24/02*   (2009.01)
  *H04W 24/08*   (2009.01)
  *H04W 24/10*   (2009.01)
  *H04W 36/00*   (2009.01)
  *H04W 48/12*   (2009.01)
  *H04W 52/24*   (2009.01)
  *H04W 64/00*   (2009.01)
  *H04W 72/04*   (2009.01)
  *H04W 84/00*   (2009.01)
  *H04W 84/06*   (2009.01)
  *H04W 88/06*   (2009.01)
  *H04W 88/10*   (2009.01)
  *H04W 92/02*   (2009.01)
  *H04W 92/10*   (2009.01)

(52) U.S. Cl.
  CPC .......... *H04W 24/02* (2013.01); *H04W 24/10* (2013.01); *H04W 36/0094* (2013.01); *H04W 48/12* (2013.01); *H04W 52/245* (2013.01); *H04W 64/006* (2013.01); *H04W 72/0453* (2013.01); *H04W 84/005* (2013.01); *H04W 84/06* (2013.01); *H04W 88/06* (2013.01); *H04W 88/10* (2013.01); *H04W 92/02* (2013.01); *H04W 92/10* (2013.01)

(58) Field of Classification Search
  CPC ....... H04W 4/30–44; H04W 24/02–10; H04W 36/0005–385; H04W 48/02–20; H04W 52/24–248; H04W 64/003–006; H04W 72/005–14; H04W 84/005–06; H04W 88/02–10; H04W 92/02; H04W 92/04; H04W 92/10; H04W 92/12
  See application file for complete search history.

(56) References Cited

U.S. PATENT DOCUMENTS

| | | | |
|---|---|---|---|
| 2012/0034917 | A1 | 2/2012 | Kazmi |
| 2016/0157161 | A1 | 6/2016 | Miao et al. |
| 2019/0012923 | A1* | 1/2019 | Weisbrod ............. G05D 1/0022 |
| 2019/0180633 | A1* | 6/2019 | Yoshizawa ........ H04W 36/0058 |

* cited by examiner

METHOD AND APPARATUS FOR CELL MEASUREMENT IN A COMMUNICATIONS SYSTEM

CROSS REFERENCE TO RELATED APPLICATION(S)

This application is a 35 U.S.C. § 371 National Phase Entry Application from PCT/EP2017/068864, filed Jul. 26, 2017, designating the United States, the disclosure of which is incorporated herein by reference in its entirety.

TECHNICAL FIELD

Embodiments herein relate generally to a base station and a method in the base station, and to a User Equipment (UE) and a method in the UE. More particularly the embodiments herein relate to radio communications, and in particular to managing radio measurements of cells.

BACKGROUND

Radio measurements are performed by a wireless device. For example a User Equipment (UE) performs measurements on radio signals of one or more cells (e.g. serving and neighbour cells) for one or more operations or tasks e.g. mobility, positioning, minimization of drive tests (MDT), self-organising networks (SON), automatic neighbour relations (ANR) etc. In idle state, for example in 3GPP Radio Resource Control (RRC) IDLE, the UE performs measurements for operations such as cell selection, cell reselection (e.g. between base station cells on the same or different carriers, between cells of different Radio Access Types (RATs) etc.), minimization of drive test (MDT), positioning etc. In connected state (e.g. RRC CONNECTED) the UE performs measurements for operations such as cell change (e.g. handover between cells on the same or different carriers, between cells of different RATs), positioning, self-organising networks (SON), signal to noise ratio (SNR).

The UE must first detect a cell, also known as cell identification. This may include acquisition of a physical cell identity (PCI) before performing the measurement. Radio measurement may include signal strength, strength quality, timing related measurement. The UE may also have to acquire the cell global ID (CGI) of a node (or cell). The cell identification and CGI acquisition are also measurements. Examples of signal strength are reference signal received power (RSRP), narrowband reference signal received power (NRSRP), sidelink reference signal received power (S-RSRP) path loss etc. Examples of signal quality are reference signal received quality (RSRQ), narrowband reference signal received quality (NRSRQ), reference signal-signal to Interference and noise ratio (RS-SINR), received signal strength indicator (RSSI). Examples of timing related measurements are: timing advance, UE Receive (Rx)-Transmit (Tx) time difference, reference signal time difference (RSTD), and round trip time.

In connected state the UE can perform intra-frequency measurements without measurement gaps. However, as a general rule the UE performs inter-frequency and inter-RAT measurements in measurement gaps. To enable inter-frequency and inter-RAT measurements for the UE requiring gaps, the network must configure the measurement gaps. For example, in 3GPP Long Term Evolution (LTE) two periodic measurement gap patterns (with 40 ms and 80 ms periods) each with a measurement gap length of 6 ms are defined for LTE.

The measurements performed by the UE are then normally reported to the network, which may use them for various tasks.

Notwithstanding aviation regulations pertaining to the use of wireless radio devices on commercial aircraft, the provision of Mobile Broadband (MBB) applications to wireless device associated with an aerial vehicle such as an aeroplane, generates two main challenges. One issue is seamless connectivity, for example to provide a seamless MBB experience in-cabin, to a UE connected to the in-cabin system from a terrestrial cellular network. It is foreseen that the aforementioned regulations could change to permit use of terrestrial mobile networks by commercial aircraft for in-cabin MBB. This may be provided by an in-cabin network connected to the terrestrial mobile network, for example a Wi-Fi network where only Wi-Fi transceivers are enabled or direct connectivity of passenger's UEs to the terrestrial mobile network, or both. It is desirable to maintain the session continuity handing over from mobile network operator (MNO)'s terrestrial network (i.e. a Public Land Mobile Network, PLMN) to the in-cabin network. One challenging issue is related to interference between terrestrial and in-cabin networks, which depends on the spectrum used in the in-cabin network and the terrestrial network. An in-cabin network may comprise small cell wireless transmit and receive points. Another issue is high-performance aircraft back-haul, to enable high capacity MBB to wireless devices associated with an aerial vehicle. Solutions need to provide an air-to-ground (A2G) link which is capable of extremely high capacity in terms of bitrate (to accommodate a large number of passengers on board) and also reasonable RTT delay such that real time applications can be supported.

Currently, A2G links are based on satellite backhaul. Due to low capacity satellite communications, there are large RTT delays which hinders real-time user experience; also, due to capacity issues, high data rate applications are not possible or cost effective. Satellite communications are inefficient for the backhaul due to multiple links being required to offer sufficient capacity. In addition a completely separate in-cabin (typically GSM) mobile network, is required, which could be costly for deployment. The system also requires special ground mobile network interference protection.

One possibility for an air-to-ground system can be based on 3GPP New Radio (NR) and/or evolved LTE. For obtaining a high capacity link, between the terrestrial base station and an aerial vehicle, beamforming technologies can be exploited and new frequencies where higher transmission bandwidth may be available.

FIG. 1 shows a typical network, 10, where aerial vehicles, 60, have wireless devices (20) onboard and wherein the air to ground backhaul is provided by either a satellite, 50, via a satellite ground station, 40 or provided by a mobile terrestrial network such as LTE comprising radio base stations, 30. Examples of aerial vehicles vary from commercial aeroplanes carrying many wireless devices (which may be served by a local wireless network) to unmanned aircraft such as drones, possibly carrying only one or two wireless devices. The wireless devices may be personal communications devices or may be an integrated wireless device without any human user interface.

The A2G backhaul link may be replaced by cellular based technologies, such as 3GPP LTE or NR (5G Radio access). Using LTE and/or NR can provide higher capacity/and/or frequency reuse, specifically, by making using of LTE and/or NR beamforming technology for air-to-ground links. This will also ensure lower costs and seamless connectivity through integration with ground mobile networks. New features in LTE and NR are needed for managing radio networks interference between A2G link, in-cabin network and terrestrial mobile networks, e.g. PLMNs.

A UE performs radio measurements (e.g. path loss, RSRP, RSRQ etc.) on signals of one or more carrier frequencies which are received by the UE. The UEs are typically assumed to be on ground level or in high rise buildings. The introduction of aerial vehicles with integrated wireless devices (e.g. drones) and aeroplanes, helicopters etc. wherein passengers are permitted to use their wireless devices will require the network to deploy cells with coverage also in the vertical dimension. However some of the cells may still have coverage mainly in horizontal plane with limited coverage in the vertical dimension.

The deployment of cell coverage in both the vertical and horizontal will however also increase UE complexity in terms of mobility procedure which mainly relies on the UE radio measurements of neighbour cells, the density of which would increase if vertical cells are deployed over the top of horizontal cells Therefore a new mechanism is needed for ensuring that good UE mobility performance is achieved under such scenario (i.e. comprising of a mixture of vertical and horizontal cells).

In U.S. Pat. No. 9,357,552 B1 networks are adjusted based on the altitude of wireless communication devices. The methods disclosed determine the number of wireless communication devices are certain altitudes and allocate resources, for example transmit power or frequencies in response to the determined number of wireless communication devices at certain altitudes.

In U.S. Pat. No. 8,639,265 B1 a radio access network (RAN) is disclosed which determines the altitude of a wireless communications device and signals a neighbour cell list which is limited to cells and or frequencies which apply to the altitude of said wireless communications device.

SUMMARY

An embodiment provides a method for performing radio measurements in a wireless device in a communications system comprising at least one network node. The method comprises obtaining an indication of a first cell carrier frequency associated with a first altitude range and an indication of a second cell carrier frequency associated with a second altitude range. The method further comprises determining an altitude of the wireless device and performing a radio measurement on a signal received from a cell operating on the first cell carrier frequency only when the altitude of the wireless device is within the first altitude range and performing a radio measurement on a signal received from a cell operating on the second cell carrier frequency only when the altitude of the wireless device is within the second altitude range. The embodiment provides the advantage that the number of cell measurements the UE needs to perform is reduced but does so without the network providing the UE with an explicit indication of cells it may measure, e.g. via a neighbour cell list. This provides the further advantage that the network only needs to allocate cells with a certain carrier frequency which it has assigned to provide altitude specific service, rather than dedicate a specific cell ID to an altitude directly. This provides an efficient method of managing radio measurements performed by wireless devices since the wireless devices do not need to inform the network of their altitude to determine whether or not they are permitted to perform a radio measurement on a detected cell. In some embodiments the carrier frequencies are reserved for specific altitudes. In other examples the carrier frequencies may be re-allocated to different altitudes depending certain network criteria, for example the network load, distribution of served UEs.

In some examples the first altitude range is indicated by a first altitude value and a first threshold parameter, wherein the first threshold parameter indicates whether the first altitude range is above or below the first altitude value and the second altitude range is indicated by a second altitude value and a second threshold parameter, wherein the second threshold parameter indicates whether the second altitude range is above or below the second altitude value. For example the first threshold parameter indicates the altitude range is valid for any UE with an altitude below the first altitude value, say 2000 metres and the second altitude threshold parameter indicates the altitude range is valid for any UE with an altitude above the second altitude value, say 2500 metres.

In other examples the second altitude range starts immediately after the end of the first altitude range and/or the first altitude range is entirely below the second altitude range.

In other examples the method further comprises reporting the radio measurement to the network node.

In other examples the method comprises reporting an information about the altitude or the altitude range of the wireless device at which the wireless device performed the radio measurement.

In other examples the method comprises receiving a data service from the network node wherein the data service is based on the reported radio measurement and/or the reported information about the altitude or the altitude range of the wireless device.

In some examples the obtaining the indication of the first cell carrier frequency and the indication of the second cell carrier frequency is by a dedicated or broadcast signal from the network node.

In some examples the wireless device performs a radio resource management or a mobility management operation based on the radio measurement and/or the altitude or the altitude range of the wireless device.

In an embodiment a method in a network node for managing radio measurements performed by a wireless device, e.g. a UE, in a communications network is provided. The method comprises determining an association of a first cell carrier frequency to a first altitude range and an association of a second cell carrier frequency to a second altitude range. The method further comprises providing the wireless device with an indication of the first cell carrier frequency associated with the first altitude range and an indication of the second cell carrier frequency associated with the second altitude range. This embodiment provides the advantage that the network node can manage cells for providing service to UEs based on the altitude of the UE. Further, the network node does not need to know the altitude of the UE, it relies on the UE only performing radio measurements on a cell when it is in the altitude range allowed for that cell.

In other examples the method comprises receiving, from the wireless device, a measurement report comprising at least one radio measurement performed by the wireless device, wherein the radio measurement is only performed on a signal from a cell operating on the first cell carrier frequency when the altitude of the wireless device is within the first altitude range and only performed on a signal received from a cell operating on the second cell carrier frequency when the altitude of the wireless device is within the second altitude range.

In some examples the method further comprises receiving from the wireless device an information about the altitude or the altitude range of the wireless device at which the wireless device performed the at least one radio measurement.

In some examples the method further comprises providing a data service to the wireless device wherein the data service is based on the reported at least one radio measurement and/or based on the received information about the altitude or the altitude range of the wireless device.

In some examples the wireless device is instructed to perform a radio resource management or a mobility management operation based on the reported at least one radio measurement and/or based on the received information about the altitude or the altitude range of the wireless device.

In some examples the first altitude range is indicated by a first altitude value and a first threshold parameter, wherein the first threshold parameter indicates whether the first altitude range is above or below the first altitude value; and the second altitude range is indicated by a second altitude value and a second threshold parameter, wherein the second threshold parameter indicates whether the second altitude range is above or below the second altitude value.

In some examples the second altitude range starts immediately after the end of the first altitude range and/or the first altitude range is entirely below the second altitude range.

In some examples the method further comprises determining the association of the first cell carrier frequency to the first altitude range and the association of the second cell carrier frequency to the second altitude range based on one or more of: cell coverage; beam characteristics; frequency range or band; and antenna characteristics.

In some examples the providing the indication of the first cell carrier frequency and the indication of the second cell carrier frequency is signalled by a dedicated or broadcast signal.

In an embodiment a wireless device for performing radio measurements in a communications system comprising at least one network node is provided. The wireless device is configured to obtain an indication of a first cell carrier frequency associated with a first altitude range and an indication of a second cell carrier frequency associated with a second altitude range. The wireless device determines the altitude of the wireless device and performs a radio measurement on a signal received from a cell operating on the first cell carrier frequency only when the altitude of the wireless device is within the first altitude range and perform a radio measurement on a signal received from a cell operating on the second cell carrier frequency only when the altitude of the wireless device is within the second altitude range.

In an embodiment a network node for managing radio measurements performed by a wireless device in a communications network is provided. The network node is configured to determine an association of a first cell carrier frequency to a first altitude range and an association of a second cell carrier frequency to a second altitude range. The network node is further configured to provide the wireless device with an indication of the first cell carrier frequency associated with the first altitude range and an indication of the second cell carrier frequency associated with the second altitude range.

In some examples the network node is further configured to receive, from the wireless device, a measurement report comprising at least one radio measurement, wherein a radio measurement is only performed on a signal from a cell operating on the first cell carrier frequency when the altitude of the wireless device is within the first altitude range and a radio measurement is only performed on a signal received from a cell operating on the second cell carrier frequency when the altitude of the wireless device is within the second altitude range.

In an embodiment, an apparatus for performing radio measurements in a communications system comprising at least one network node is provided. The apparatus comprises a processor, a memory, and a transceiver circuit. The transceiver circuit is configured to obtain an indication of a first cell carrier frequency associated with a first altitude range and an indication of a second cell carrier frequency associated with a second altitude range. The processor is executable to determine the altitude of the wireless device. The transceiver circuit is further configured to perform a radio measurement on a signal received from a cell operating on the first cell carrier frequency only when the altitude of the wireless device is within the first altitude range and perform a radio measurement on a signal received from a cell operating on the second cell carrier frequency only when the altitude of the wireless device is within the second altitude range.

In another embodiment, an apparatus for managing radio measurements performed by a wireless device in a communications network is provided. The apparatus comprises a processor, a memory, and a transceiver circuit. The processor is configured to determine an association of a first cell carrier frequency to a first altitude range and an association of a second cell carrier frequency to a second altitude range. The transceiver circuit is configured to provide, to a wireless device, an indication of a first cell carrier frequency associated with a first altitude range and an indication of a second cell carrier frequency associated with a second altitude range.

In another embodiment a wireless device control application is provided. The wireless device control application comprises a transceiver module, a determination module, and a measurement module. The Transceiver module is configured to obtain an indication of a first cell carrier frequency associated with a first altitude range and an indication of a second cell carrier frequency associated with a second altitude range. The determination module is configured to determine the altitude of the wireless device. The transceiver module is configured to perform a radio measurement on a signal received from a cell operating on the first cell carrier frequency only when the altitude of the wireless device is within the first altitude range and perform a radio measurement on a signal received from a cell operating on the second cell carrier frequency only when the altitude of the wireless device is within the second altitude range.

In other examples the wireless device control application comprises the aforementioned modules and/or other modules configured to perform any of the methods disclosed herein.

In another embodiment a network node control application comprising a transceiver module and a determination module is provided. The determination module is configured to determine an association of a first cell carrier frequency to a first altitude range and an association of a second cell carrier frequency to a second altitude range. The transceiver module is configured to provide, to a wireless device, an indication of a first cell carrier frequency associated with a first altitude range and an indication of a second cell carrier frequency associated with a second altitude range.

In other examples the network node control application comprises the aforementioned modules and/or other modules configured to perform any of the methods disclosed herein.

In another embodiment a computer program or, a computer program product or a carrier containing a computer program, comprising instructions which, when executed on at least one processor, causes the at least one processor to carry out a method according to any one of the examples disclosed herein.

DETAILED DESCRIPTION

Figure 1:
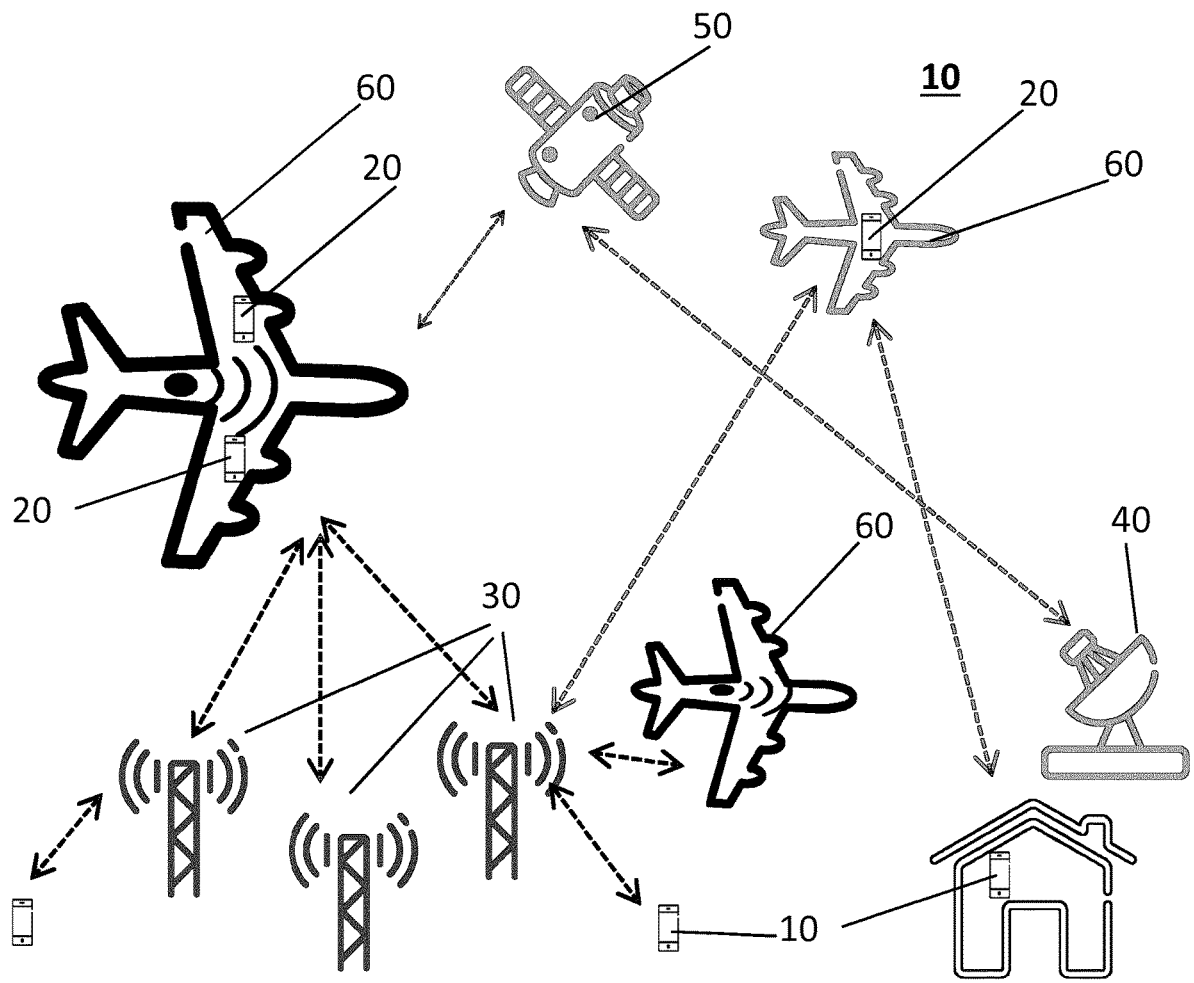
FIG. 1 is a block diagram illustrating an example network environment according to the prior art.

In some embodiments a more general term "network node" is used and it can correspond to any type of radio network node or any network node, which communicates with a User Equipment (UE) and/or with another network node. A network node may comprise a radio access network, RAN, or a radio base station, or part thereof such as a remote antenna unit. Other examples of network nodes, or known terms for radio access nodes are NodeB, enhanced NodeB (eNodeB or eNB), base transceiver station (BTS), access point (AP), transmission and reception points, TRPs, remote radio unit, RRU, Remote Radio Head, RRH, nodes in distributed antenna system (DAS). A network node may also comprise core network node (e.g. Mobile Switching Centre, MSC, Mobility Management Entity, MME, etc.), O&M, Operation Support Systems, OSS, Self-Organised Networks, SON, positioning node (e.g. Enhanced Serving Mobile Location Centre, E-SMLC), Minimisation of Drive Test, MDT, test equipment, etc.

In some embodiments the non-limiting term wireless device is used and it refers to any type of wireless device communicating with a network node and/or with another wireless device. Examples of a wireless device are "user equipment" (UE) which includes device to device (D2D) UE, machine type communication (MTC) UE or UE capable of machine to machine (M2M) communication, Personal Digital Assistant (PDA) tablet computer, mobile terminals, smart phone, laptop embedded equipped (LEE), laptop mounted equipment (LME), Universal Serial Bus (USB) dongles.

Some embodiments are described using terms from $3^{rd}$ Generation Partnership Project (3GPP) Long Term Evolution (LTE) or LTE based systems such as Machine Type Communication (MTC), enhanced MTC, Narrowband Internet Of Things (NB-IoT). However the embodiments are applicable to any Radio Access Type (RAT) or multi-RAT systems, where the wireless device receives and/or transmit signals (e.g. data) Example RATs are: LTE Frequency Division Duplex (FDD)/Time Division Duplex (TDD), Wideband Code Division Multiple Access (WCDMA)/High Speed Packet Access (HSPA), Groupe Spécial Mobile (GSM)/GSM Edge Radio Access Network (GERAN), Wi-Fi, WLAN, CDMA2000, 5G, New Radio (NR).

5G, the fifth generation of mobile telecommunications and wireless technology is not yet fully defined but in an advanced draft stage within 3GPP. It includes work on 5G New Radio (NR) Access Technology. LTE terminology is used in this disclosure in a forward looking sense, to include equivalent 5G entities or functionalities although a different term may be specified in 5G. A general description of the agreements on 5G New Radio (NR) Access Technology so far is contained in most recent versions of the 3GPP 38-series Technical Reports.

Embodiments disclosed are applicable for a wireless device, or UE, in a low or in high activity state. Examples of low activity state are RRC idle state, idle mode etc. Examples of high activity state are RRC CONNECTED state, active mode, active state etc. The UE may be configured to operate in discontinuous reception (DRX) or in continuous reception (non-DRX). If configured to operate in DRX, it may still operate according to non-DRX as long as it receives new transmissions from the network node.

In some examples, a wireless device or UE can be a transceiver station located in a flying vehicle, with a non-limiting term: Flying Transceiver Station (FTS).

Figure 2:
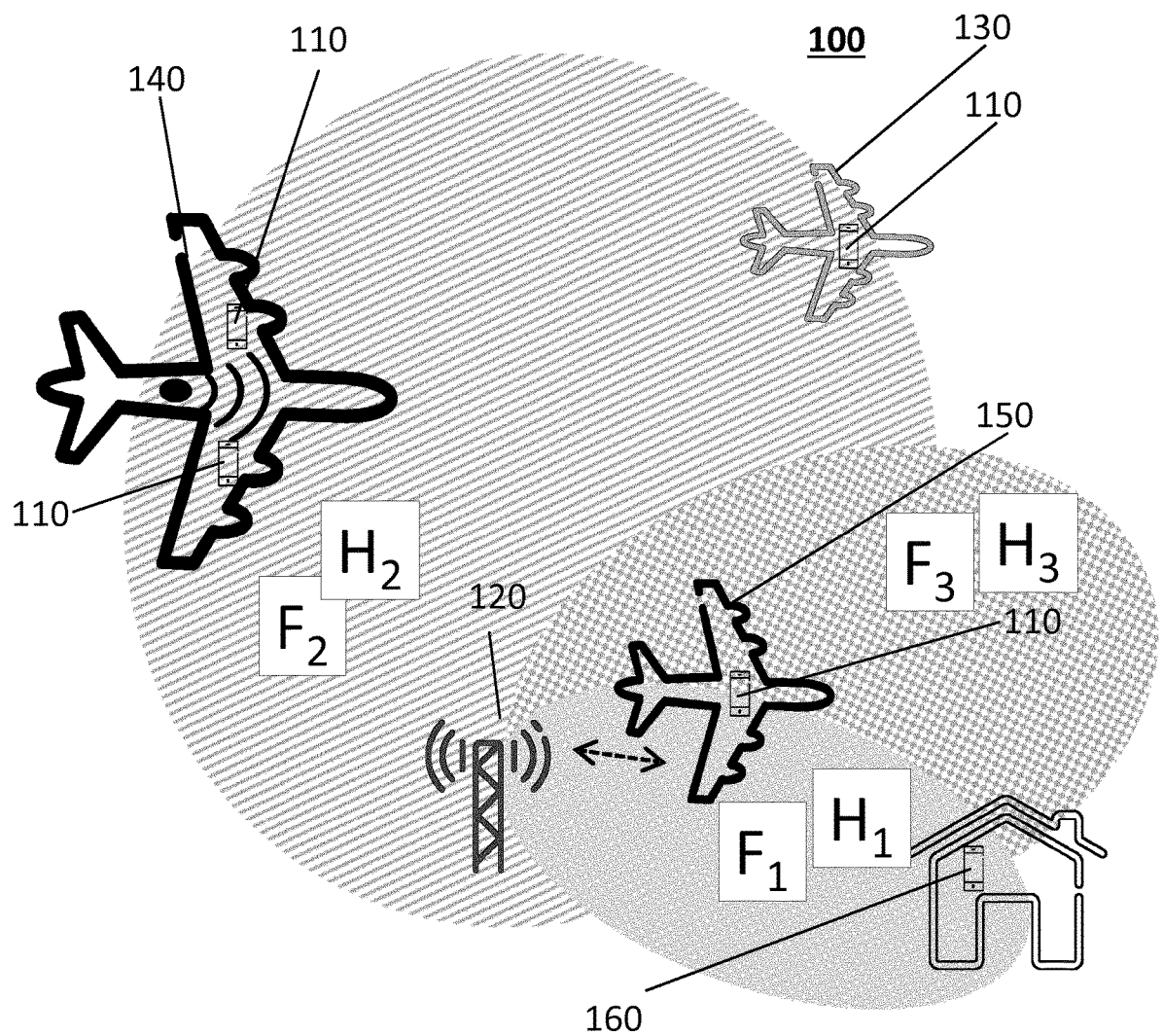
FIG. 2 is a block diagram illustrating embodiments of the present disclosure.

In a cellular system such as LTE, LTE evolution, or NR where certain cells may be adapted to provide a vertical cell coverage up to 100 km, wireless devices in high altitude aerial vehicles may rely solely on radio communication rather than satellite. However, as the various types of aerial vehicle with wireless device capability, such as drones for example, traverse these cells the wireless device should perform radio measurements on the cells it detects. In LTE for example the UE is not directed to a list of neighbour cells, rather it performs measurements on any cell detected. An example of such a scenario network, 100, is depicted in FIG. 2 where a base station, 120, provides three cells at frequencies F1, F2 and F3. It should be understood that the scenario may also be depicted with 3 separate base stations. Aerial vehicles, 130, 140, 150, traverse the radio coverage provided by the base station and depending on the altitude the wireless devices, 110, therein may detect and perform measurements on one, two or all three of the cells. Also depicted is a land based wireless device, 160, which is able to detect two of the cells, F1 and F3.

In some examples it is desirable to dedicate certain cells to certain altitudes. This can be achieved to some degree through multiple antenna systems providing beamforming, however there can still be some overlap or interference between terrestrial devices (i.e. devices within an altitude range intended to be served by a horizontal cell) and aerial devices intended to be served by a vertical cell. This can be seen in FIG. 2 where the cells F1 and F3 are overlapping and can both be detected by wireless devices in aerial vehicle 150 and terrestrial device 160.

By allocating cells operating on a certain frequency to a certain altitude range, e.g. A1, A2, A3, a network node, e.g. radio access network, can control which devices perform and report measurements on which cells. This may be achieved by a radio access network, or network node, signalling for each cell frequency a parameter indicative of the altitude range associated to that cell.

The embodiments are described considering two carrier frequencies (F1 and F2) and their respective altitude ranges. However these embodiments are applicable for any number of carriers and their associations with respect to their corresponding altitudes ranges. For example the network node may further determine an association between a third carrier (F3) and a third altitude range. The actual association depends upon the height over which a particular carrier frequency operates and/or over which the UE is allowed to perform measurements on that carrier.

In more detail, the network node determines associations between at least one carrier frequency, F1, and at least one altitude parameter, H1, and between at least one carrier frequency, F2, and at least one altitude parameter, H2. For example a cell operating on carrier frequency F1 can provide or is allowed to provide network coverage within a range indicated by H1. In some examples H1 indicates a height with respect to a reference altitude (e.g. sea level, ground level, pre-defined altitude etc.) and thereby provides an altitude range from the reference altitude to height H1. Similarly a cell operating on carrier frequency F2 can provide or is allowed to provide network coverage within a range indicated by H2. In some examples H2 indicates a height with respect to a reference altitude (e.g. sea level, ground level, pre-defined altitude etc.) and thereby provides an altitude range from the reference altitude to height H2. The altitude ranges may overlap or may be mutually exclusive. An overlapping range would permit a land based wireless device measuring signals from either cell frequency whereas an aerial wireless device once above the lower of the two ranges would cease to perform measurements on the frequency associated to the lower altitude range. A mutually exclusive range associated with the two frequencies would entirely separate the land based and aerial wireless devices at a certain altitude, for example altitude range A1 may be entirely below altitude range A2.

In other examples the altitude parameter, e.g. H1, H2 provides an altitude range by comprising two altitude values, i.e. a lower and an upper bound, each value with respect to a reference altitude such as sea level.

In some examples the altitude parameter includes a threshold parameter. For example carrier F1 can provide or is allowed to provide network coverage only up to a certain height (H1) i.e. the threshold parameter indicates that H1 is an upper bound. Similarly, carrier F2 can provide or is allowed to provide network coverage above certain height (H2), i.e. the threshold parameter indicates that H2 is a lower bound. As previously described the ranges may be overlapping or mutually exclusive. For example the second altitude range starts immediately after the end of the first altitude range. In some examples the first altitude range is entirely below the second altitude range.

Figure 3:
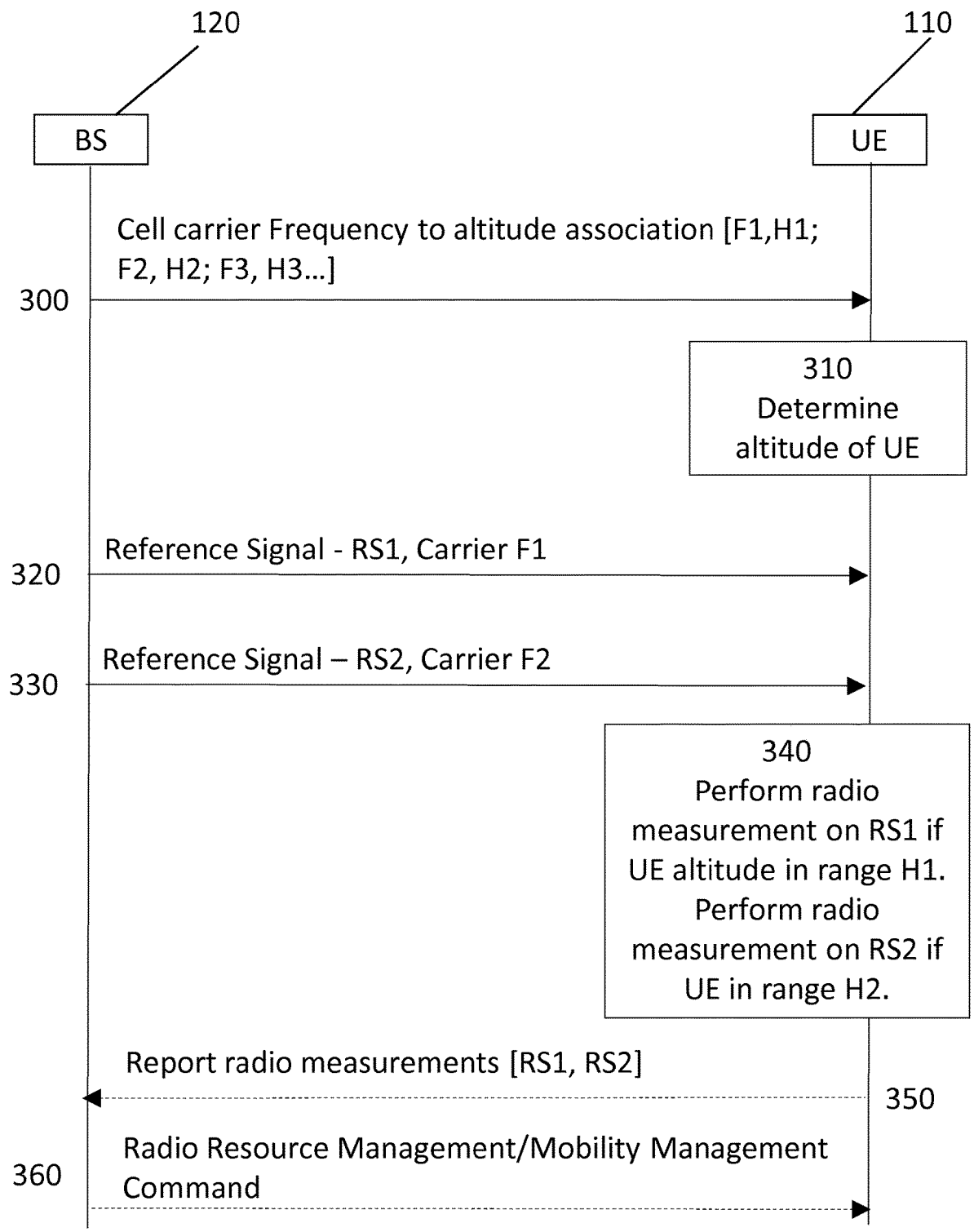
FIG. 3 is a signaling sequence according to embodiments of the present disclosure.

In FIG. 3 an example signaling sequence is shown. The network node or base station, (BS) 120 at step 300 transmits the cell carrier frequency to altitude association (e.g. {F1, H1}, {F2, H2}) to the wireless device (UE), 110. In some examples this is transmitted in a broadcast message, for example in system information, which is received by a plurality of wireless devices. In other examples this is transmitted as dedicated information to the UE 110, for example in a RRC configuration message when the UE is in connected mode. In other examples the cell carrier frequency to altitude association may be configured by a network management procedure for example via over-the-air (OTA) configuration. At step 310 the UE, 110, determines its altitude (Hu) and compares it with the received or obtained parameters related to the altitudes (e.g. H1, H2) and determines whether the UE, 110, is allowed to perform measurements on reference signals of cells operating on the carrier frequency F1 and/or F2. There are many known methods for a wireless device to determine its altitude, typically as part of standard positioning methods. Such methods are described in more detail below. At step 320 and 330 the BS, 120, transmits reference signals RS1 and RS2, respectively. RS1 and RS2 may be any kind of reference signal upon which a wireless device should perform radio measurements, for example cell specific reference signals, demodulation signals, channel state information reference signals. At step 340 the UE, 110, performs radio measurements on the reference signals if determined to do so the determined carrier(s) F1 and/or F2 and may use the results for one or more operations. For example, the UE may adjust its measurement patterns and/or sleep cycles as a result of the determined cell frequencies on which it may or may not measure signals. At step 350 UE, 110, may report measurements to its serving network node, 120. This step depends on the wireless device being configured to report radio measurements and also whether it receives reference signal from cells operating on carrier frequencies which the UE, 110, has determined it is allowed to measure. In some embodiments the wireless device may also report its altitude to the network node. At step 360 the network node may signal a radio resource control or mobility management message or command to UE, 110, as a result of the reported measurements. For example, the network node may command the wireless device to change its serving cell, or cells, or may adjust the wireless device's measurement pattern and/or sleep cycles. The network node may also perform other tasks as a result of the measurement report, for example the network node may switch on additional transmission points or allocate additional resources (e.g. Coordinated Multi-point, CoMP, Heterogenous Network, HetNet, operation, carrier aggregation, CA).

Figure 4:
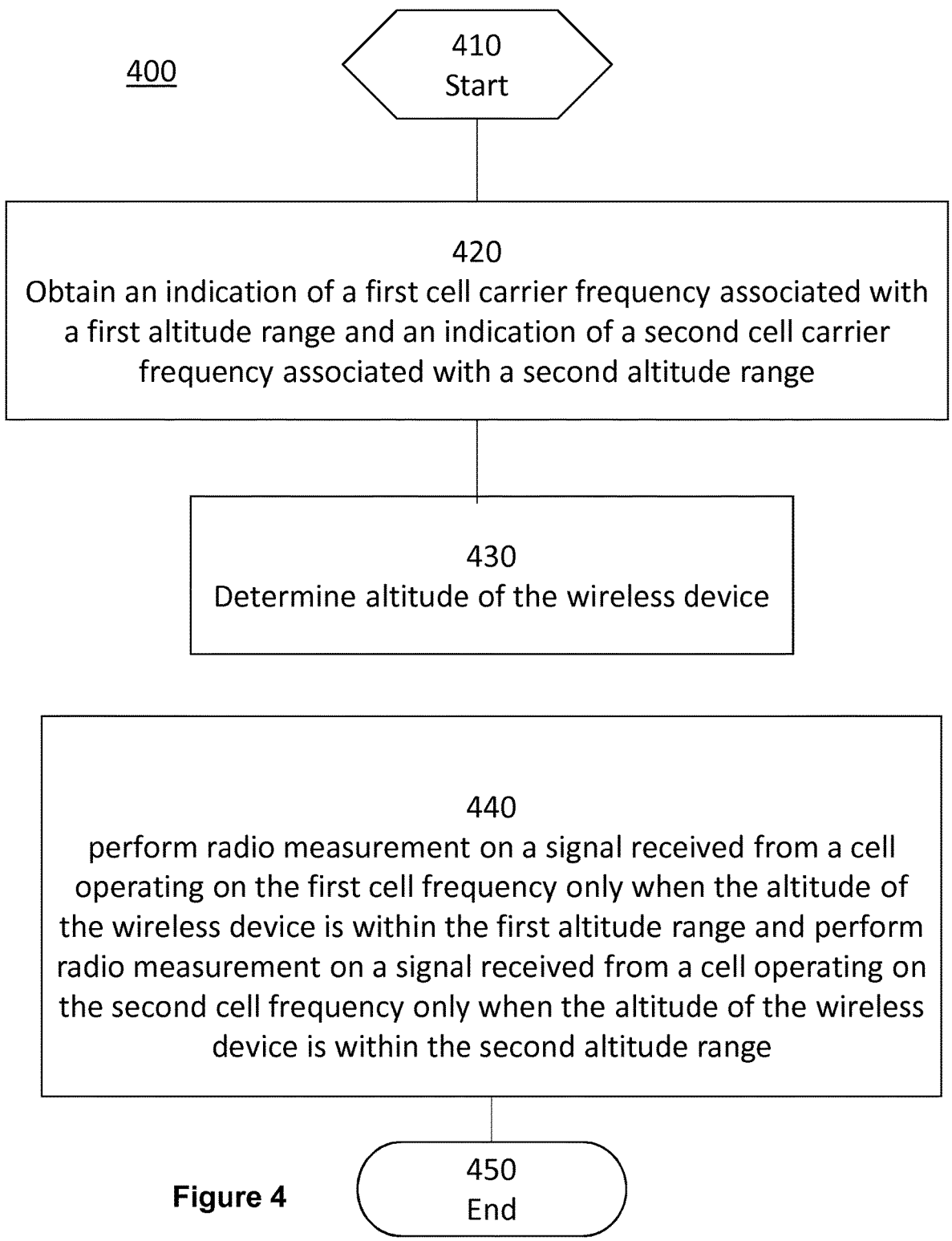
FIG. 4 is a flow diagram illustrating an exemplary method implemented by a wireless device according embodiments of the present disclosure.

The procedures performed by a wireless device will be discussed in more detail, in conjunction with the method 400, depicted in FIG. 4. The method starts at step 410, for a wireless device served by one or more network nodes, e.g. radio base stations, in a communications system. The wireless device, e.g. a UE may be in IDLE mode or CONNECTED mode. At step 420 the wireless device obtains an indication of a first cell carrier frequency associated with a first altitude range and an indication of a second cell carrier frequency associated with a second altitude range; In some examples the indication of a cell carrier frequency is an actual frequency value 'f'. In other examples the indication is a number which corresponds to the carrier frequency such as the UTRA (UMTS (Universal Mobile Telecommunications System) Terrestrial Radio Access) Absolute Radio Frequency Channel Number (UARFCN) for WCDMA systems or Enhanced-UTRA RFCN for LTE systems. In some examples the first and second altitude ranges are indicated by an upper and lower height, wherein the range allowed for the cell is within the two heights. Typically, a height indicates a vertical distance above a reference, for example sea level. However, the reference height may be another known value, for example the lowest ground level in the cell or a value configured by the network.

In some examples the indication of a first cell carrier frequency associated with a first altitude range and an indication of a second cell carrier frequency associated with a second altitude range may be received by the wireless device in the same message or the indication of a first cell carrier frequency associated with a first altitude range may be received in a different message to the indication of a second cell carrier frequency associated with a second altitude range.

The information may be received on one or more cells operating on the carrier frequencies F1 and/or F2. The information may also be received in one or more cells operating on another carrier frequency, e.g. F3.

In step 430 the wireless device or UE determines its altitude (Hu) with respect to a reference altitude (G1). Examples of G1 are sea level, ground level in certain region, a value configured by the network node, a pre-defined value, the lowest point in a given region, the highest point in a given region etc. The wireless device or UE may determine its altitude by means of positioning techniques and/or based on information received from another node.

Examples of such techniques are:
by using Global Navigation Satellite System (GNSS) receiver in the UE,
by using an Assisted GNSS (A-GNSS) receiver in the UE,
by one or more non-GNSS positioning techniques e.g. enhanced cell ID, Observed Time Difference of Arrival (OTDOA), Uplink Time Difference of Arrival (UTDOA) etc.
combination of positioning techniques,
based on the altitude of the aerial vehicle housing the UE. For example the UE may receive information about the altitude of aerial vehicle and derive Hu from the received information about the altitude. In one example the UE may assuming that Hu is equal to the altitude of aerial vehicle housing the UE. In another example the UE may derive Hu by using a pre-defined mapping between UE altitude and the altitude of the aerial vehicle housing the UE,
receiving parameter Hu from another node (e.g. another UE capable of D2D operation etc.).

In step 440 the UE compares Hu and H1, and compared Hu and H2. Based on said comparison the UE determines whether the UE is allowed to perform measurements on signals of F1 and/or on signals of F2. The selection of F1 and F2 based on the said comparison is based on the same principle as described in sections 5.2.2 (UE embodiment, Step 2).

In one example the UE is required to perform measurements only on F1 provided that the UE altitude (Hu) is lower than H1 and the UE is required to perform measurements only on F2 provided that Hu is higher than H2. The parameters H1, H2 and Hu are defined with respect to a reference altitude (G1). Examples of G1 are sea level, ground level in certain region, a value configured by the network node, a pre-defined value, lowest point in a given region, highest point in a given region etc. In one example H1=H2 whereas in another example H1≠H2 (e.g. H1<H2).

In another example when H1≠H2 (e.g. H1<H2), the UE is required to perform measurements only on F1 provided that Hu≤H1, the UE is required to perform measurements only on F2 provided that Hu>H2 and when Hu is between H1 and H2 then the UE is required to do measurements on both F1 and F2.

In yet another example when H1≠H2 (e.g. H1<H2), the UE is required to perform measurements only on F1 provided that Hu≤H1, the UE is required to perform measurements only on F2 provided that Hu>H2 and when Hu is between H1 and H2 then the UE is required to do measurements on at least one of F1 and F2. In the last case for example the UE may decide to perform measurement on the carrier (F1 or F2) whose signals are strongest (e.g. in terms of signal strength and/or signal quality at the UE).

The measurements may be performed by the UE on signals of one or more cells operating on the carrier i.e. on signals of cells belonging to F1 and/or F2. The measurements may also be performed on the entire carrier e.g. RSSI, received carrier power etc.

The UE performs a radio measurement on a signal received from a cell operating on the first cell carrier frequency only when the altitude of the wireless device is within the first altitude range and performs a radio measurement on a signal received from a cell operating on the second cell frequency only when the altitude of the wireless device is within the second altitude range.

The measurements may be performed by the UE on signals of one or more cells operating on each determined or t selected carrier i.e. measurement on signals transmitted on cells belonging to F1 and/or F2. The signals used for measurements may be transmitted by the cell in the DL and/or by the UE in the uplink. Examples of cell specific or cell level measurements are signal strength (e.g. RSRP, path loss etc.), signal quality (e.g. SNR, SINR, RS-SINR, RSRQ etc.), timing measurements (e.g. timing advance, propagation delay, UE Rx-Tx time difference, RSTD etc.).

The measurements may also be performed on the entire carrier i.e. on signals of plurality of cells or of all cells belonging to the determined carrier. Examples of carrier specific or carrier level measurements are RSSI, received carrier power etc.

As described above, in some embodiments the first altitude range is indicated by a first altitude value and a first threshold parameter, wherein the first threshold parameter indicates whether the first altitude range is above or below the first altitude value and the second altitude range is indicated by a second altitude value and a second threshold parameter, wherein the second threshold parameter indicates whether the second altitude range is above or below the second altitude value.

The UE may receive altitude parameters indicating that the second altitude range starts immediately after the end of the first altitude range, thus providing seamless vertical coverage. In other examples the parameters indicate the first altitude range is entirely below the second altitude range but there may be a vertical distance between the two ranges.

In some embodiments the wireless device, or UE, reports the radio measurements for at least one signal received on a cell operating on a carrier frequency as permitted to be measured according to the rules previously described. In some examples the report comprises a plurality of measurements on a plurality of signals on one or more cells operating on one or more carrier frequencies.

In some embodiments the wireless device, or UE, reports information about the altitude or the altitude range of the wireless device at which the wireless device performed the above described radio measurement. In some examples the wireless device transmits this information in the same report as transmitted for the radio measurements, in other examples the information about the altitude or altitude range is transmitted in a separate report.

In some embodiments the wireless device receives a data service from the network node as a result of the reported radio measurement or the reported information about the altitude or the altitude range of the wireless device. Depending on the status of the wireless device (IDLE mode or CONNECTED mode) the response from the network node, e.g radio base station will vary. For example the data service may be an initial service by providing a random access response followed by dedicate resources/physical data channels. In other examples the data service may comprise additional cells and associated dedicated resources to which the wireless device may connect. In other examples the data service provided based on the reported measurements and/or altitude information may comprise a Mobile Broadband (MBB) application specifically tailored to the altitude of the wireless device.

In other examples the network node or radio access initiates cell change procedures or handover of the wireless device to a neighbour cell.

In some embodiments the wireless device performs a radio resource management or a mobility management operation based on the radio measurement and/or the altitude or the altitude range of the wireless device The wireless device or UE may use the results of the radio measurement performed on F1 and/or F2 for one or more operational tasks. Examples of such tasks are:

- Transmitting the measurement results to the network node,
- Transmitting the measurement results to another UE capable of D2D operation (e.g. ProSe operation, V2X operation etc.),
- Performing cell change e.g. cell selection, cell reselection, handover, RRC re-establishment, RRC connection release with redirection,
- Positioning etc.
- Adaptation of receiver,
- Power control etc.

Figure 5:
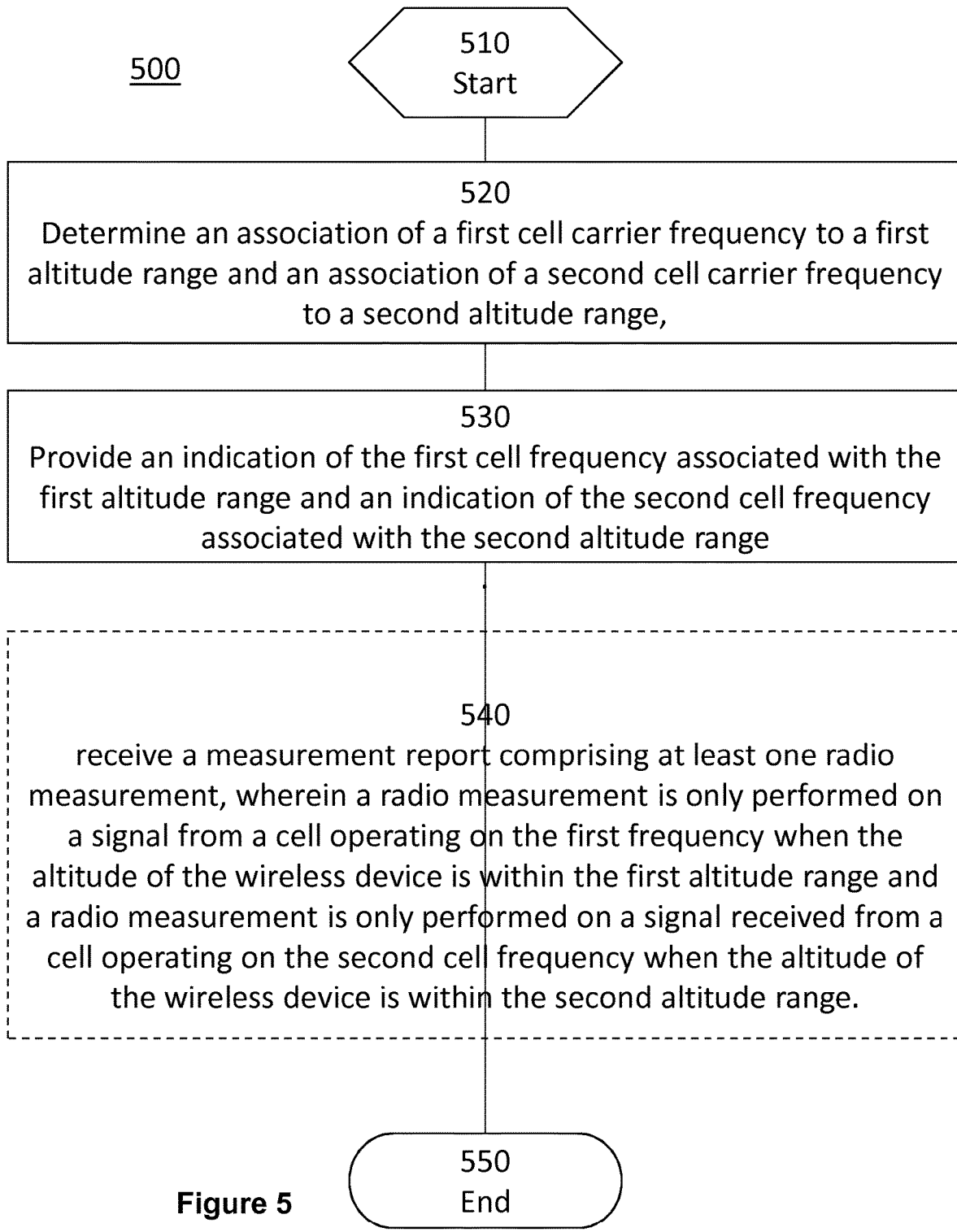
FIG. 5 is a flow diagram illustrating an exemplary method implemented by a network node according to embodiments of the present disclosure.

FIG. 5 describes in more detail the procedures performed by network node, through the steps of method 500. The method for managing radio measurements performed by a wireless device starts at step 510 where a network node, e.g. radio access such as eNodeB or gNb provides service to one or more wireless devices such as a UE. At step 520 the network node determines an association of a first cell carrier frequency to a first altitude range and an association of a second cell carrier frequency to a second altitude range, In other examples the network node determines one or more associations, based on one or more criteria. In some examples the network node determines a first association or relation or mapping, which relates a first carrier frequency (F1) to a first altitude parameter (H1), and a second association or relation or mapping, which relates a second carrier frequency (F2) and a second altitude parameter (H2).

Examples of criteria for determining the associations are:
Cell coverage: Carriers which have larger coverage can be used for serving UEs which are located inside or on an aerial vehicle when the vehicle reaches above certain height. The cell coverage can be extended by increasing for example transmit power of the base station, Beam characteristics: For example certain carrier may be served by beams directed upwards towards the sky. These carriers can be used for serving UEs which are located inside or on an aerial vehicle when it reaches above certain height, Frequency range or band: Certain frequencies may be suitable for serving UEs on the ground or at lower height. For example frequencies below 1 GHz which have better coverage may be used for serving the UEs at lower height or on the ground. However, carriers above 2 GHz can still be suitable for serving UEs at higher altitude since the propagation condition is mainly line of sight, Antenna characteristics: If the base station has larger number of transmit antennas (e.g. 8 or more antennas) then the signals of carriers used by that base station can be beamformed. This gives better directivity and coverage of signals. Such carriers can be used for serving UEs which are located inside or on an aerial vehicle when the vehicle reaches above certain height.

The associations define altitudes or altitude ranges over which the first cell carrier frequency, F1 and the second cell carrier frequency, F2 respectively, are allowed to be used by the UE for performing one or more radio measurements.

At step 530 the network node provides the wireless device with an indication of a first cell carrier frequency associated with a first altitude range and an indication of a second cell carrier frequency associated with a second altitude range. In some examples the associated is predetermined by network management procedure. The network node may provide the indication of a first cell carrier frequency associated with a first altitude range and an indication of a second cell carrier frequency associated with a second altitude range, i.e. the associations, in a dedicated signal to the wireless device (e.g. UE specific channel such as PDSCH). or the network node may provide the associations in a broadcast signal. The broadcast signal may be a general system information message or it may be a specific type of system information which is only applicable to specific types of wireless device. The network node may provide the association in both system information and also certain tailored information dedicated to a given UE via dedicated control signaling.

The information may be transmitted in one or more cells belonging to F1 and/or F2. The information may also be transmitted in one or more cells operating on another carrier e.g. F3.

The information about F1 and F2 may be expressed in terms of carrier frequency identifiers (e.g. channel number, ARFCN, EARFCN, NARFCN etc.). The information about F1 and F2 may be signaled to the UE in the same message or in different messages.

The network node may transmit the information to the UE according to any one or more of the following principles: periodically and occasionally (event basis). The occasional transmission takes place when one or more conditions or events are triggered or met.

Examples of such conditions are: change in the association between the carrier and the altitude, when UE altitude changes, when radio transmission characteristics of signals on F1 and/or F2 change etc. Examples of radio transmission characteristics are beam direction, transmit power, beam width, number of beams per cell etc.

In some embodiments the first altitude range is indicated by a first altitude value and a first threshold parameter, wherein the first threshold parameter indicates whether the first altitude range is above or below the first altitude value; and the second altitude range is indicated by a second altitude value and a second threshold parameter, wherein the second threshold parameter indicates whether the second altitude range is above or below the second altitude value.

In some embodiments the second altitude range starts immediately after the end of the first altitude range and/or the first altitude range is entirely below the second altitude range.

In step 540, the network node optionally receives from the wireless device, a measurement report comprising at least one radio measurement performed by the wireless device, wherein the radio measurement is only performed on a signal from a cell operating on the first cell carrier frequency when the altitude of the wireless device is within the first altitude range and only performed on a signal received from a cell operating on the second cell carrier frequency when the altitude of the wireless device is within the second altitude range.

In some embodiments the network node receives from the wireless device an information about the altitude or the altitude range of the wireless device at which the wireless device performed the at least one radio measurement. In some examples the information is received in the same report message as transmitted for the radio measurements, in other examples the information about the altitude or altitude range is received in a separate report or protocol message.

In some embodiments the network node provides a data service to the wireless device as a result of the reported radio measurement and/or the reported information about the altitude or the altitude range of the wireless device. Depending on the status of the wireless device (IDLE mode or CONNECTED mode) the response from the network node, e.g. radio base station will vary. For example the data service may be an initial service by providing a random access response followed by dedicate resources/physical data channels. In other examples the data service may comprise additional cells and associated dedicated resources to which the wireless device may connect. In other examples the data service provided based on the reported measurements and/or altitude information may comprise a Mobile Broadband (MBB) application specifically tailored to the altitude of the wireless device.

In other examples the network node or radio access initiates cell change procedures or handover of the wireless device to a neighbour cell.

In some embodiments the network node commands the wireless device to performs a radio resource management or a mobility management operation based on the radio measurement and/or the altitude or the altitude range of the wireless device.

In some embodiments the network node uses the results of the radio measurements and/or the information about the altitude or the altitude range of the wireless device for performing one or more radio operational tasks. Examples of such tasks are cell change, positioning, network planning and tuning of parameters, power control etc. Examples of cell change are handover, RRC connection release with redirection, cell reconfiguration etc.

Figure 6:
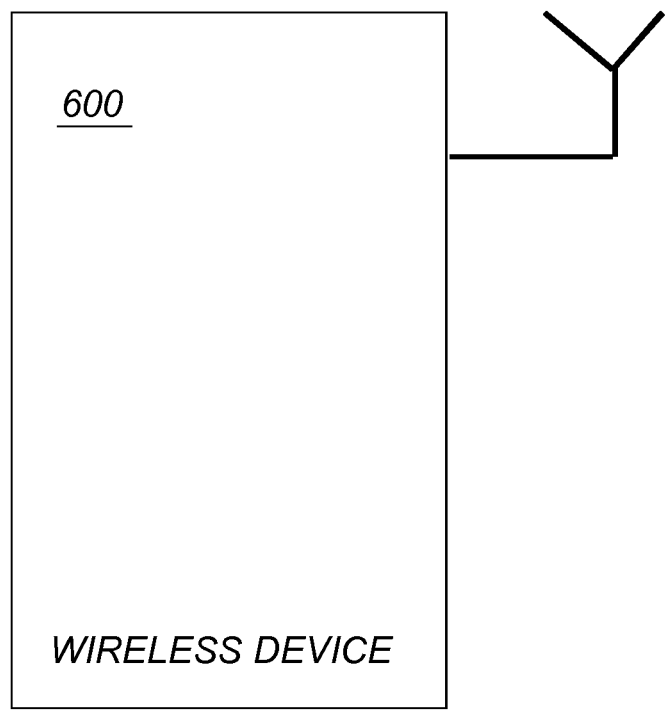
FIG. 6 is a block diagram illustrating example hardware useful for implementing the methods described herein, according to one or more embodiments of the present disclosure.

In some embodiments a wireless device, 110, is configured to perform one or more of the examples described herein. An example wireless device, 600, is depicted in FIG. 6. The wireless device, 600, is suitable for performing radio measurements in a communications system comprising at least one network node. In an embodiment the wireless device is configured to obtain an indication of a first cell carrier frequency associated with a first altitude range and an indication of a second cell carrier frequency associated with a second altitude range. The wireless device is further configured to determine the altitude of the wireless device and performs radio measurements depending on the determined altitude. The wireless device performs a radio measurement on a signal received from a cell operating on the first cell carrier frequency only when the altitude of the wireless device is within the first altitude range and perform a radio measurement on a signal received from a cell operating on the second cell carrier frequency only when the altitude of the wireless device is within the second altitude range.

In some embodiments the wireless device, 600, is further configured to report the radio measurement to the network node, e.g. to its serving base station.

In some embodiments the wireless device, 600, is further configured to report information about its altitude or altitude range to the network node. The reported altitude or altitude range may be signalled together with the report of the radio measurement. In which case the altitude information may correspond to the altitude of the wireless device at which the radio measurement was performed.

In some embodiments the wireless device, 600, is configured to receive a data service from the network node wherein the data service is based on the reported radio measurements, the reported altitude information or both.

Figure 7:
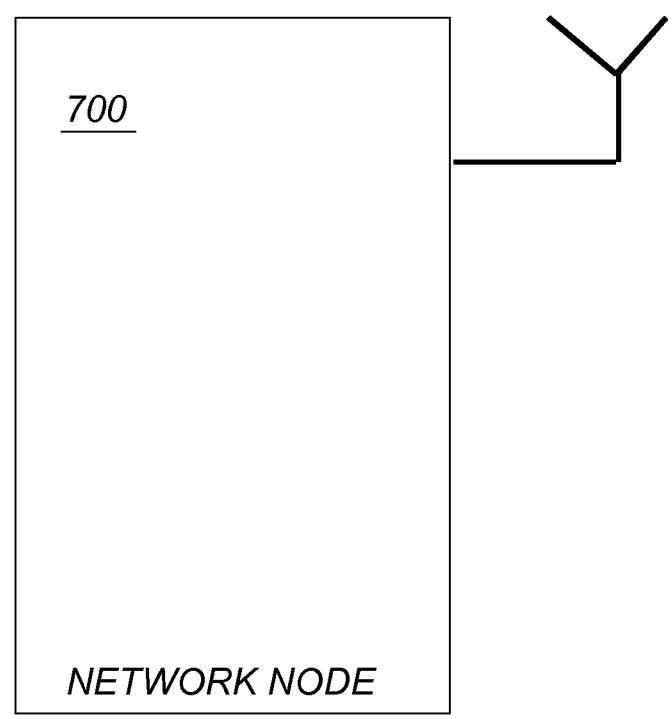
FIG. 7 is a block diagram illustrating example hardware useful for implementing the methods described herein, according to one or more embodiments of the present disclosure.

In other embodiments a network node, for example an eNodeB or gNB, is configured to perform one or more of the examples described herein. An example network node, 700, is depicted in FIG. 7. The network node, 700, is suitable for managing radio measurements performed by a wireless device, or UE. In an embodiment the network node, 700, is configured to determine an association of a first cell carrier frequency to a first altitude range and an association of a second cell carrier frequency to a second altitude range. The network node is further configured to provide the wireless device with an indication of the first cell carrier frequency associated with the first altitude range and an indication of the second cell carrier frequency associated with the second altitude range.

In some embodiments the network node, 700, is further configured to receive, from the wireless device, a measurement report comprising at least one radio measurement, wherein a radio measurement is only performed on a signal from a cell operating on the first cell carrier frequency when the altitude of the wireless device is within the first altitude range and a radio measurement is only performed on a signal received from a cell operating on the second cell carrier frequency when the altitude of the wireless device is within the second altitude range.

In other embodiments the network node is further configured to receive from the wireless device an information about the altitude or the altitude range of the wireless device at which the wireless device performed the at least one radio measurement.

In some examples the network node receives the information about the altitude of the wireless device in the same message as the radio measurement report.

In other embodiments the network node, 700, performs one or more actions based on the received radio measurements and/or altitude information. For example, the network node. 700, may provide or adapt a data service to the wireless device. In other examples the network node commands the wireless device to change cells or provides the wireless device with additional cells.

Figure 8:
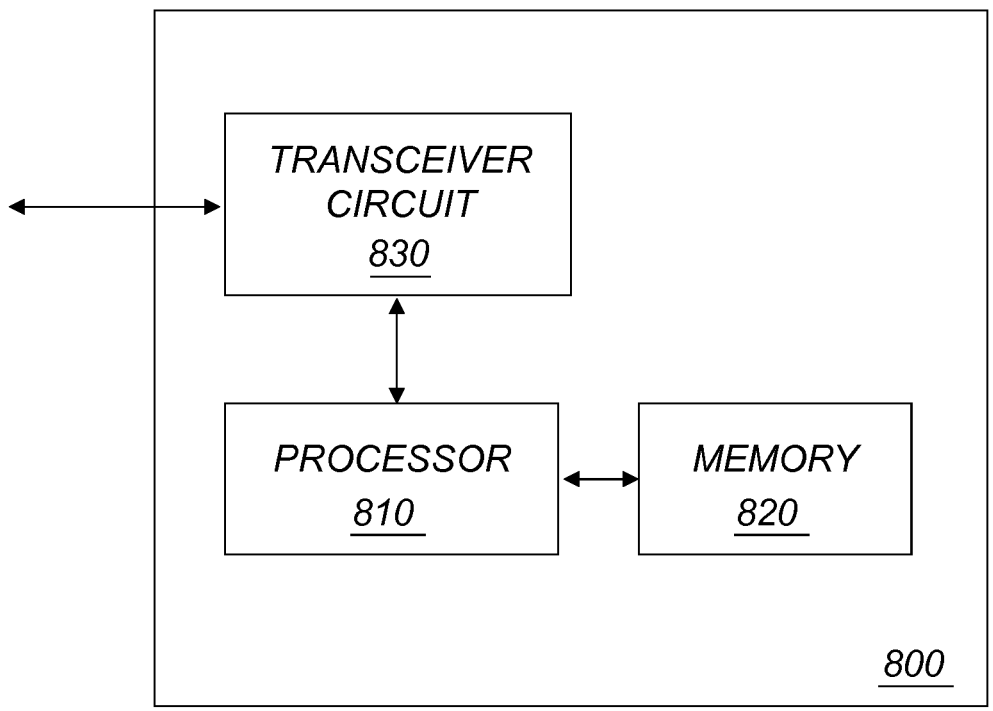
FIG. 8 is a block diagram illustrating example physical units of processing circuitry of a wireless device useful for implementing the methods described herein, according to one or more embodiments of the present disclosure.

In some embodiments an apparatus is provided suitable for performing radio measurements in a communications system is provided. An example is depicted in FIG. 8. The apparatus, 800, comprises a processor, 810, a memory, 820, and a transceiver circuit, 830. The transceiver circuit, 830, is configured to obtain an indication of a first cell carrier frequency associated with a first altitude range and an indication of a second cell carrier frequency associated with a second altitude range. The processor, 810, is executable to determine the altitude of the wireless device. The transceiver circuit, 830, is further configured to perform a radio measurement on a signal received from a cell operating on the first cell carrier frequency only when the altitude of the wireless device is within the first altitude range and perform a radio measurement on a signal received from a cell operating on the second cell carrier frequency only when the altitude of the wireless device is within the second altitude range.

Said apparatus, 800, may be further configured to perform any other example disclosed herein.

Figure 9:
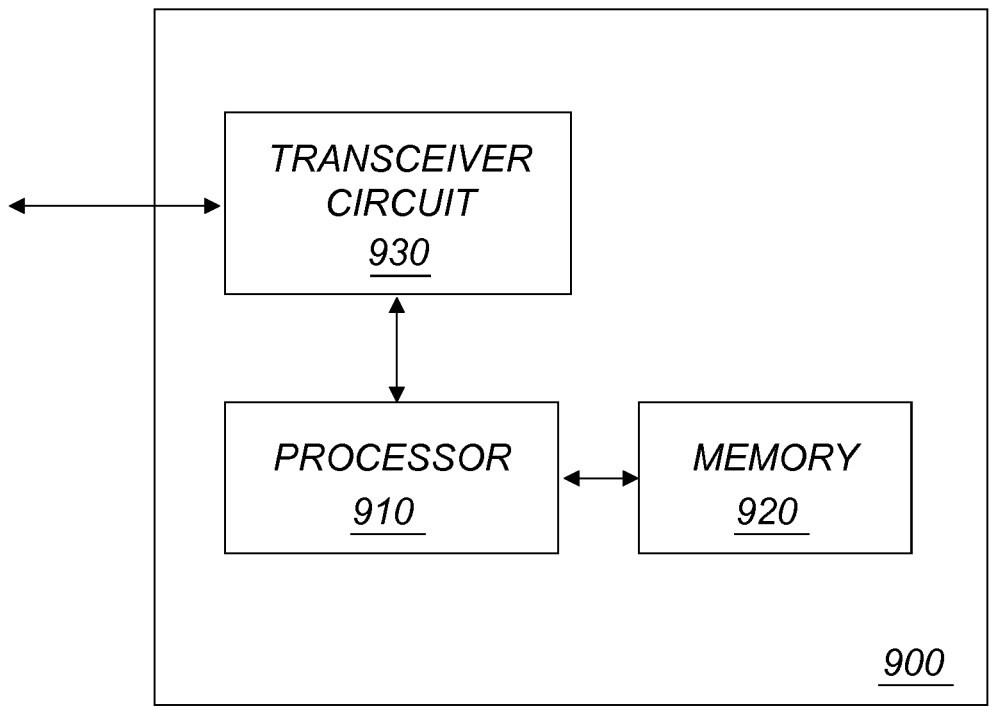
FIG. 9 is a block diagram illustrating example physical units of processing circuitry of a network node useful for implementing the methods described herein, according to one or more embodiments of the present disclosure.

In other embodiments an apparatus is provided suitable for managing radio measurements performed by a wireless device in a communications network is provided. An example apparatus, 900, is depicted in FIG. 9. The apparatus, 900, comprises a processor, 910, a memory, 920, and a transceiver circuit, 930. The processor is configured to determine an association of a first cell carrier frequency to a first altitude range and an association of a second cell carrier frequency to a second altitude range. The transceiver circuit, 930, is configured to provide, to a wireless device, an indication of a first cell carrier frequency associated with a first altitude range and an indication of a second cell carrier frequency associated with a second altitude range.

In other embodiments the transceiver circuit, 930, is further configured to receive, from the wireless device, a measurement report comprising at least one radio measurement, wherein a radio measurement is only performed on a signal from a cell operating on the first cell carrier frequency when the altitude of the wireless device is within the first altitude range and a radio measurement is only performed on a signal received from a cell operating on the second cell carrier frequency when the altitude of the wireless device is within the second altitude range.

In other embodiments the apparatus, 900, uses the results of the radio measurements and/or the information about the altitude or the altitude range of the wireless device for performing one or more radio operational tasks. Examples of such tasks are cell change, positioning, network planning and tuning of parameters, power control etc. Examples of cell change are handover, RRC connection release with redirection, cell reconfiguration etc. In other examples the apparatus 900, may provide or adapt a data service to the wireless device.

Figure 10:
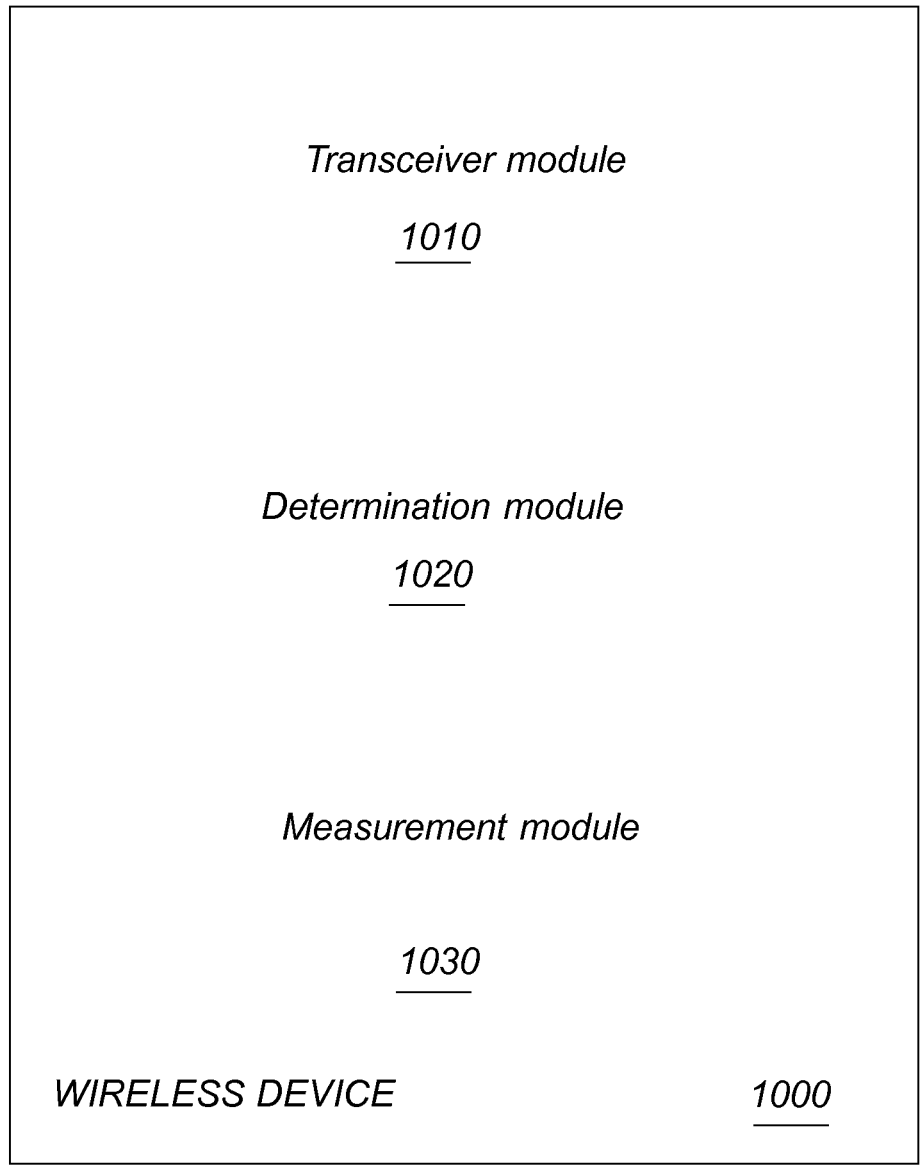
FIG. 10 is a block diagram illustrating example software modules of a wireless device control application useful for implementing the methods described herein, according to one or more embodiments of the present disclosure.

In some embodiments a wireless device control application, 1000, comprises a transceiver module, 1010, a determination module, 1020, and a measurement module, 1030. An example of such a wireless device is depicted in FIG. 10. The Transceiver module, 1010, is configured to obtain an indication of a first cell carrier frequency associated with a first altitude range and an indication of a second cell carrier frequency associated with a second altitude range. The determination module, 1020, is configured to determine the altitude of the wireless device. The transceiver module, 1010, is configured to perform a radio measurement on a signal received from a cell operating on the first cell carrier frequency only when the altitude of the wireless device is within the first altitude range and perform a radio measurement on a signal received from a cell operating on the second cell carrier frequency only when the altitude of the wireless device is within the second altitude range.

Said wireless device control application, 1000, may comprise the aforementioned modules and/or other modules configured to perform any other example disclosed herein.

Figure 11:
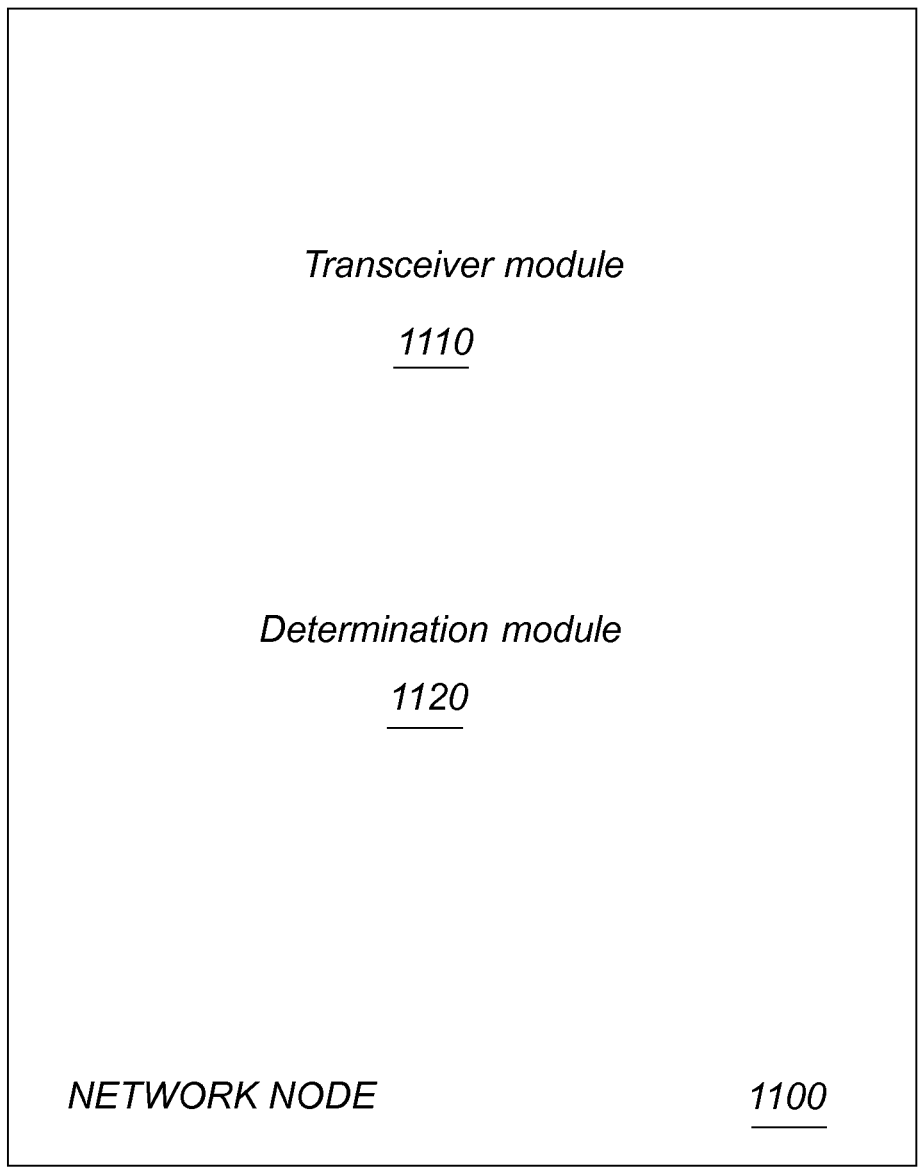
FIG. 11 is a block diagram illustrating example software modules of a network node control application useful for implementing the methods described herein, according to one or more embodiments of the present disclosure.

In other embodiments a network node control application, 1100, comprises a transceiver module, 1110, and a determination module, 1120. An example of such a network node is depicted in FIG. 11. The determination module, 1120, is configured to determine an association of a first cell carrier frequency to a first altitude range and an association of a second cell carrier frequency to a second altitude range. The transceiver module, 1110, is configured to provide, to a wireless device, an indication of a first cell carrier frequency associated with a first altitude range and an indication of a second cell carrier frequency associated with a second altitude range.

In further embodiments the transceiver module, 1110, is further configured to receive, from the wireless device, a measurement report comprising at least one radio measurement, wherein a radio measurement is only performed on a signal from a cell operating on the first cell carrier frequency when the altitude of the wireless device is within the first altitude range and a radio measurement is only performed on a signal received from a cell operating on the second cell carrier frequency when the altitude of the wireless device is within the second altitude range.

Said network node control application, 1100, may comprise the aforementioned modules and/or other modules configured to perform any other example disclosed herein.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed. Any disclosure of an individual embodiment does not preclude the combination of features of that embodiment with another embodiment disclosed herein.

The invention claimed is:

1. A method for performing radio measurements in a wireless device in a communications system comprising at least one network node, the method comprising:
    obtaining an indication of a first cell carrier frequency associated with a first altitude range and an indication of a second cell carrier frequency associated with a second altitude range, wherein the first altitude range is indicated by a first altitude value and a first threshold parameter, wherein the first threshold parameter indicates whether the first altitude range is above or below the first altitude value, wherein the second altitude range is indicated by a second altitude value and a second threshold parameter, and wherein the second threshold parameter indicates whether the second altitude range is above or below the second altitude value;
    determining an altitude of the wireless device;
    performing a radio measurement on a signal received from a cell operating on the first cell carrier frequency only when the altitude of the wireless device is within the first altitude range and performing a radio measurement on a signal received from a cell operating on the second cell carrier frequency only when the altitude of the wireless device is within the second altitude range; and reporting information about the altitude or an altitude range of the wireless device at which the wireless device performed the radio measurement.

2. The method of claim 1, wherein the second altitude range starts immediately after the end of the first altitude range and/or the first altitude range is entirely below the second altitude range.

3. The method of claim 1, further comprising reporting the radio measurement to the network node.

4. The method of claim 3, further comprising receiving a data service from the network node, wherein the data service is based on the reported radio measurement and/or the reported information about the altitude or the altitude range of the wireless device.

5. The method of claim 1, wherein the obtaining the indication of the first cell carrier frequency and the indication of the second cell carrier frequency is by a dedicated or broadcast signal from the network node.

6. The method of claim 1, wherein the wireless device performs a radio resource management or a mobility management operation based on the radio measurement and/or the altitude or the altitude range of the wireless device.

7. A method in a network node for managing radio measurements performed by a wireless device in a communications network, the method comprising:

determining an association of a first cell carrier frequency to a first altitude range and an association of a second cell carrier frequency to a second altitude range;

providing the wireless device with an indication of the first cell carrier frequency associated with the first altitude range and an indication of the second cell carrier frequency associated with the second altitude range, wherein the first altitude range is indicated by a first altitude value and a first threshold parameter, wherein the first threshold parameter indicates whether the first altitude range is above or below the first altitude value; and the second altitude range is indicated by a second altitude value and a second threshold parameter, wherein the second threshold parameter indicates whether the second altitude range is above or below the second altitude value;

receiving from the wireless device information about an altitude or an altitude range of the wireless device at which the wireless device performed at least one radio measurement; and receiving from the wireless device a measurement report comprising said at least one radio measurement performed by the wireless device, wherein said at least one radio measurement is only performed on a signal from a cell operating on the first cell carrier frequency when the altitude of the wireless device is within the first altitude range and only performed on a signal received from a cell operating on the second cell carrier frequency when the altitude of the wireless device is within the second altitude range.

8. The method of claim 7, further comprising providing a data service to the wireless device, wherein the data service is based on the reported at least one radio measurement and/or based on the received information about the altitude or the altitude range of the wireless device.

9. The method of claim 7, wherein the wireless device is instructed to perform a radio resource management or a mobility management operation based on the reported at least one radio measurement and/or based on the received information about the altitude or the altitude range of the wireless device.

10. The method of claim 7, wherein
(i) the second altitude range starts immediately after the end of the first altitude range and/or the first altitude range is entirely below the second altitude range,
(ii) the method further comprises determining the association of the first cell carrier frequency to the first altitude range and the association of the second cell carrier frequency to the second altitude range based on one or more of:
cell coverage;
beam characteristics;
frequency range or band; or
antenna characteristics, and/or
(iii) the providing the indication of the first cell carrier frequency and the indication of the second cell carrier frequency is signalled by a dedicated or broadcast signal.

11. A wireless device for performing radio measurements in a communications system comprising at least one network node, the wireless device configured to:

obtain an indication of a first cell carrier frequency associated with a first altitude range and an indication of a second cell carrier frequency associated with a second altitude range, wherein the first altitude range is indicated by a first altitude value and a first threshold parameter, wherein the first threshold parameter indicates whether the first altitude range is above or below the first altitude value; and the second altitude range is indicated by a second altitude value and a second threshold parameter, wherein the second threshold parameter indicates whether the second altitude range is above or below the second altitude value;

determine an altitude of the wireless device;

perform a radio measurement on a signal received from a cell operating on the first cell carrier frequency only when the altitude of the wireless device is within the first altitude range and perform a radio measurement on a signal received from a cell operating on the second cell carrier frequency only when the altitude of the wireless device is within the second altitude range; and report information about the altitude or an altitude range of the wireless device at which the wireless device performed the radio measurement.

12. The wireless device of claim 11, wherein
(i) the second altitude range starts immediately after the end of the first altitude range and/or the first altitude range is entirely below the second altitude range,
(ii) the wireless device is further configured to report a radio measurement to the network node and to receive a data service from the network node, wherein the data service is based on the reported radio measurement and/or based on the reported information about the altitude or the altitude range of the wireless device,
(iii) obtaining the indication of the first cell carrier frequency and the indication of the second cell carrier frequency is by a dedicated or broadcast signal from the network node, and/or
(iv) the wireless device is further configured to perform a radio resource management or a mobility management operation based on a radio measurement and/or the altitude or altitude range of the wireless device.

13. A network node for managing radio measurements performed by a wireless device in a communications network, the network node is configured to:
- determine an association of a first cell carrier frequency to a first altitude range and an association of a second cell carrier frequency to a second altitude range;
- provide the wireless device with an indication of the first cell carrier frequency associated with the first altitude range and an indication of the second cell carrier frequency associated with the second altitude range, wherein the first altitude range is indicated by a first altitude value and a first threshold parameter, wherein the first threshold parameter indicates whether the first altitude range is above or below the first altitude value; and the second altitude range is indicated by a second altitude value and a second threshold parameter, wherein the second threshold parameter indicates whether the second altitude range is above or below the second altitude value;
- receive from the wireless device information about an altitude or an altitude range of the wireless device at which the wireless device performed at least one radio measurement; and
- receive from the wireless device a measurement report comprising said at least one radio measurement performed by the wireless device, wherein
- said at least one radio measurement is only performed on a signal from a cell operating on the first cell carrier frequency when the altitude of the wireless device is within the first altitude range and only performed on a signal received from a cell operating on the second cell carrier frequency when the altitude of the wireless device is within the second altitude range.

14. The network node of claim 13, further configured to:
- receive from the wireless device a measurement report comprising said at least one radio measurement, wherein
- (i) said at least one radio measurement is only performed on a signal from a cell operating on the first cell carrier frequency when the altitude of the wireless device is within the first altitude range and a radio measurement is only performed on a signal received from a cell operating on the second cell carrier frequency when the altitude of the wireless device is within the second altitude range,
- (ii) the network node is further configured to provide a data service to the wireless device wherein the data service is based on the reported at least one radio measurement and/or based on the received information about the altitude or the altitude range of the wireless device, (iii) the network node is further configured to instruct the wireless device to perform a radio resource management or a mobility management operation is based on said at least one radio measurement and/or based on the received information about the altitude or the altitude range of the wireless device,
- (iv) the second altitude range starts immediately after the end of the first altitude range or the first altitude range is entirely below the second altitude range,
- (v) the network node is further configured to determine the association of the first cell carrier frequency to the first altitude range and the association of the second cell carrier frequency to the second altitude range based on one or more of:
  - cell coverage;
  - beam characteristics;
  - frequency range or band; or
  - antenna characteristics, and/or
- providing the indication of the first cell carrier frequency and the indication of the second cell carrier frequency is by a dedicated or broadcast signal to the wireless device.

15. An apparatus for performing radio measurements in a communications system comprising at least one network node, the apparatus comprising a processor, a memory, and a transceiver circuit, wherein:
- the transceiver circuit is configured to obtain an indication of a first cell carrier frequency associated with a first altitude range and an indication of a second cell carrier frequency associated with a second altitude range, wherein the first altitude range is indicated by a first altitude value and a first threshold parameter, wherein the first threshold parameter indicates whether the first altitude range is above or below the first altitude value; and the second altitude range is indicated by a second altitude value and a second threshold parameter, wherein the second threshold parameter indicates whether the second altitude range is above or below the second altitude value;
- the processor is configured to determine an altitude of the wireless device;
- the transceiver circuit is further configured to perform a radio measurement on a signal received from a cell operating on the first cell carrier frequency only when the altitude of the wireless device is within the first altitude range and perform a radio measurement on a signal received from a cell operating on the second cell carrier frequency only when the altitude of the wireless device is within the second altitude range; and
- the transceiver circuit is further configured to report information about the altitude or an altitude range of the wireless device at which the wireless device performed the radio measurement.

16. An apparatus for managing radio measurements performed by a wireless device in a communications network, the apparatus comprising a processor, a memory, and a transceiver circuit, wherein:
- the processor is configured to determine an association of a first cell carrier frequency to a first altitude range and an association of a second cell carrier frequency to a second altitude range,
- the transceiver circuit is configured to provide the wireless device with an indication of the first cell carrier frequency associated with the first altitude range and an indication of the second cell carrier frequency associated with the second altitude range, wherein the first altitude range is indicated by a first altitude value and a first threshold parameter, wherein the first threshold parameter indicates whether the first altitude range is above or below the first altitude value; and the second altitude range is indicated by a second altitude value and a second threshold parameter, wherein the second threshold parameter indicates whether the second altitude range is above or below the second altitude value;
- the transceiver circuit is further configured to receive from the wireless device information about an altitude or an altitude range of the wireless device at which the wireless device performed at least one radio measurement; and
- the transceiver device is further configured to receive from the wireless device a measurement report comprising said at least one radio measurement performed by the wireless device, wherein said at least one radio measurement is only performed on a signal from a cell operating on the first cell carrier frequency when the altitude of the wireless device is within the first altitude range and only performed on a signal received from a cell operating on the second cell carrier frequency when the altitude of the wireless device is within the second altitude range.

\* \* \* \* \*